United States Patent
Prexl et al.

(10) Patent No.: US 8,531,168 B2
(45) Date of Patent: Sep. 10, 2013

(54) ELECTRONIC DEVICE AND METHOD FOR DC-DC CONVERSION

(75) Inventors: Franz Prexl, Oberding (DE); Juergen Neuhaeusler, Bad Aibling (DE)

(73) Assignee: Texas Instruments Deutschland GmbH, Freising (DE)

( * ) Notice: Subject to any disclaimer, the term of this patent is extended or adjusted under 35 U.S.C. 154(b) by 279 days.

(21) Appl. No.: 12/885,146

(22) Filed: Sep. 17, 2010

(65) Prior Publication Data

US 2011/0068754 A1    Mar. 24, 2011

(30) Foreign Application Priority Data

Sep. 24, 2009   (DE) .......................... 10 2009 042 890

(51) Int. Cl.
*G05F 1/569* (2006.01)

(52) U.S. Cl.
USPC .......................... 323/299; 323/298; 363/56.03

(58) Field of Classification Search
USPC ........... 323/299, 293, 298; 361/92; 307/103; 363/56.03
See application file for complete search history.

(56) References Cited

U.S. PATENT DOCUMENTS

| | | | |
|---|---|---|---|
| 4,504,898 A | | 3/1985 | Pilukaitis et al. |
| 5,640,059 A | * | 6/1997 | Kammiller et al. ............. 307/66 |
| 7,142,401 B2 | * | 11/2006 | Daniels et al. .................. 361/18 |
| 8,159,092 B2 | * | 4/2012 | Luthi et al. ..................... 307/130 |
| 2009/0016087 A1 | * | 1/2009 | Shimizu .......................... 363/89 |
| 2009/0160415 A1 | | 6/2009 | Polivka |

OTHER PUBLICATIONS

DE Search Report dated Jun. 7, 2010.

* cited by examiner

*Primary Examiner* — Harry Behm
(74) *Attorney, Agent, or Firm* — William B. Kempler; W. James Brady; Frederick J. Telecky, Jr.

(57) ABSTRACT

An electronic device for DC-DC conversion of an input voltage into an output voltage is provided. The electronic device includes a current mode control loop for controlling a sensed current of the DC-DC conversion by comparing a voltage level indicating a magnitude of the sensed current with a reference voltage level indicating the maximum admissible magnitude of the sensed current. The reference voltage level is dynamically adjusted in response to a change of an input voltage level.

8 Claims, 4 Drawing Sheets

ELECTRONIC DEVICE AND METHOD FOR DC-DC CONVERSION

CROSS-REFERENCE TO RELATED APPLICATIONS

This patent application claims priority from German Patent Application No. 10 2009 042 890.9, filed Sep. 24, 2009, which is incorporated herein by reference in its entirety.

FIELD OF THE INVENTION

The invention relates to an electronic device for DC-DC conversion and a method.

BACKGROUND OF THE INVENTION

DC-DC converters generally use different control mechanisms for adjusting and stabilizing their output voltage and output current. In order to maintain a constant output voltage level, a DC-DC converter draws current from an input power in order to meet what is required by the load. The maximum output current is limited by a current control mechanism. The current control mechanism typically senses the output current, converts the sensed magnitude into a corresponding voltage level and compares this voltage level with a given reference voltage level. The reference voltage level defines the upper and/or lower limit for the output current. However, the current drawn from the input power supply can cause a significant voltage drop across the output impedance of the input power supply. This can adversely affect the available input voltage level for the DC-DC conversion. Conventionally, this is prevented by setting an upper limit for the output current of the DC-DC converter including a safety margin for power supplies having relatively large output impedances. However, even then, the output impedance of the input power supply may exceed any maximum values and the input voltage level may drop below a minimum. This usually triggers an under-voltage lockout mechanism and the DC-DC converter is turned off.

SUMMARY OF THE INVENTION

A general object of the invention to provide an electronic device for DC-DC conversion and a method which are configured to prevent under-voltage lockout due to an output impedance of an input power supply.

According to an aspect of the invention, an electronic device for DC-DC conversion of an input voltage into an output voltage is provided. The electronic device comprises a control loop for controlling a magnitude of a sensed current (current mode control) by comparing a voltage level indicating a magnitude of a sensed current of the DC-DC conversion with a reference voltage level. The reference voltage level indicates the maximum admissible magnitude of the sensed current. This control mechanism is also referred to as current mode control. The sensed current may be a current through an inductor or through a switch. The electronic device may then be configured to dynamically adjust the reference voltage level in response to a change of an input voltage level so as to limit a current drawn from the input power supply. The input voltage level is the voltage level at an input voltage rail of the electronic device outside the input power supply which has (includes) an output impedance. This aspect of the invention provides that the current drawn from the input power supply is limited. The control mechanism is advantageously based on an adjustment of a reference voltage level used in a current mode control loop. This means that the control variable is the voltage level for limiting the sensed current, which has a direct influence on the input current. Furthermore, "dynamically adjusting" means that the current is continuously reduced if an input voltage level of the DC-DC converter drops. Therefore, a premature under-voltage lockout can be prevented. Furthermore, due to this aspect of the invention, the electronic device is kept in an optimum, which is referred to as maximum power point.

In an embodiment of the invention, the circuitry for dynamically adjusting the reference voltage level may comprise a voltage divider for providing the reference voltage level and a transistor. The transistor may be coupled to the voltage divider. The transistor may then be controlled in order to vary a voltage drop of the voltage divider in response to the change of the input voltage. This is a very efficient modification in order to prevent under-voltage lockout, as a voltage divider is usually provided in order to provide the constant reference voltage level that serves to limit the current. According to this aspect of the invention, the existing voltage divider may be adapted and configured to vary the reference voltage level in response to the input voltage level.

In an embodiment, the voltage divider may be configured to generate a reference voltage level suitable for limiting the sensed current. This reference voltage level may then be adjusted in response to the change of the input voltage level, and this reduces the input current. A control gate of the transistor may be coupled with the control gate of a diode-coupled transistor. The diode-coupled transistor may be coupled in series with a current source and a resistor. The resistor may then be coupled with one side to the input voltage rail (having the input voltage level) and with the other side to the diode-coupled transistor. The current source may be coupled to the other side of the diode-coupled transistor. This provides a very efficient and small circuitry that can directly influence the reference voltage level. The reference voltage level may then be adjusted in response to an increasing and decreasing input voltage level.

The voltage divider may be a resistive voltage divider comprising a series of resistors. One side of a resistor of the series of resistors may then be coupled to a first side of the channel of the control transistor. The other side of the resistor of the series of resistors may then be coupled to the other side of the channel of the control transistor. Increasing or decreasing the voltage level on the control gate of the control transistor provides that the combined resistance of the control transistor and the resistor of the series of resistors is increased and decreased.

A current source may be coupled to the voltage divider in order to supply a constant current to the voltage divider. This provides that the reference voltage level is only controlled through a changing resistance of the control transistor, i.e. in response to variations of the input voltage level.

According to another aspect of the invention, a method of controlling a current drawn from an input power supply of an electronic device for DC-DC conversion is provided. In this method a current mode control can be used for controlling a magnitude of a sensed current. For current mode control, a voltage level is generated, which indicates a magnitude of the sensed current. The voltage level is compared with a reference voltage level for limiting the magnitude of the sensed current to a maximum. The reference voltage level is then adjusted in response to an input voltage level of the input power supply.

BRIEF DESCRIPTION OF THE DRAWINGS

Further aspects of the invention will ensue from the description herein below of preferred embodiments of the invention with reference to the accompanying drawings, wherein.

DESCRIPTION OF THE EMBODIMENTS

Figure 1:
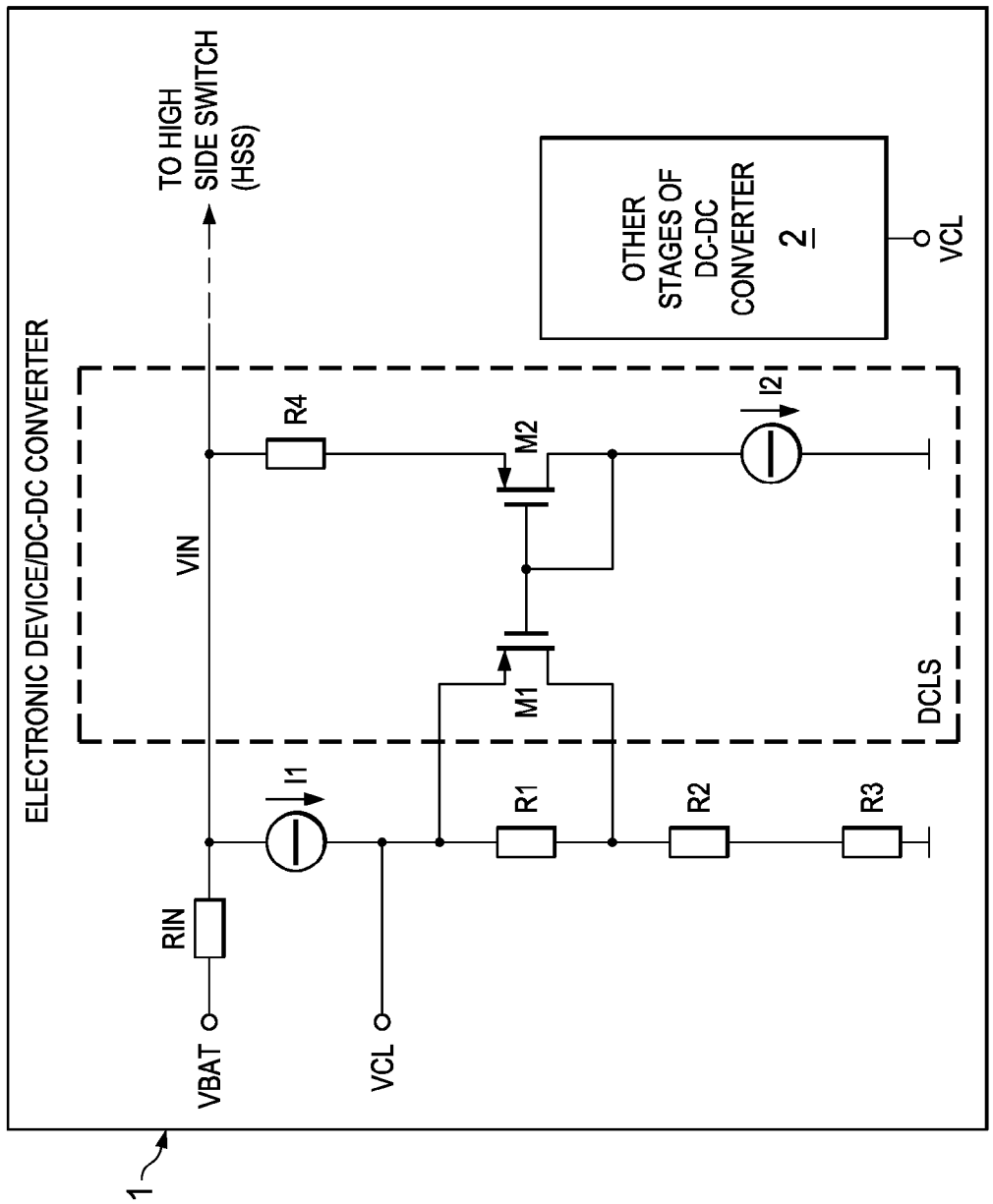
FIG. 1 shows a simplified circuit diagram of a first embodiment of the invention.

FIG. 1 shows a simplified circuit diagram of an embodiment of the invention. There is an electronic device, for example an integrated electronic device 1. The electronic device may be configured to perform DC-DC conversion. The electronic device 1 may include a plurality of other stages, which are required for performing a DC-DC conversion. All the required remaining stages for DC-DC conversion are represented by the single stage 2. According to aspects of the invention, the electronic device includes a current mode control loop, which may also be included in stage 2. According to current mode control, a magnitude of a current (first current) is sensed and converted into a voltage level. This voltage level is compared with a reference voltage level. If the reference voltage level is exceeded, a power switch is triggered to limit the magnitude of the sensed current. Furthermore, there is a dynamic current limiting stage DCLS. The internal voltage level of the input power supply (without input impedance) is present at VBAT. The output impedance of the input power supply is represented by resistor RIN. The input supply voltage rail has the input voltage level VIN. VIN is available for DC-DC conversion and may be applied to a high side switch of a buck/boost DC-DC converter. In another embodiment, for example for a boost converter, it may be coupled to the inductor. It may also be coupled to various other stages included in stage 2 of a DC-DC converter. There is a sensed current source I1 providing a first current to a series of resistors R1, R2 and R3. The series of resistors R1, R2 and R3 implements a resistive divider for generating a reference voltage level VCL. The reference voltage level VCL may then be applied to stage 2, where a comparator may be provided for comparing a voltage level derived from a sensed current with the reference voltage level VCL. A transistor M1 is coupled in parallel to resistor R1 in order to vary the reference voltage level VCL in response to the input voltage level VIN. The first side of the channel of M1 (which is a PMOS transistor in this embodiment) is coupled to one side of resistor R1. The other side of the channel of transistor M1 is coupled to the other side of R1. The control gate of transistor M1 is coupled to the control gate of another transistor M2 (also a PMOS transistor in this embodiment). The second transistor M2 is a diode-coupled transistor. The diode-coupled transistor M2 is coupled in series with a resistor R4 and another current source I2. Resistor R4 is coupled between the channel of M2 and the input supply voltage rail VIN. If the voltage level at the input voltage supply rail VIN is high enough, transistor M1 is turned off (not conducting). The reference voltage level is then equal to a preset voltage level required for limiting the magnitude of the output current. However, if the output current (or load current) increases, the voltage drop across the output impedance RIN may increase and the input voltage level VIN can decrease. Accordingly, the voltage level at the source of transistor M2 drops. Due to the constant current source I2, the source gate voltage of transistor M2 remains constant. In order to maintain a constant source gate voltage, the voltage level at the control gate of M2 must drop. This provides that transistor M1, which is coupled with its control gate to the control gate of M2, is turned on. The more the input voltage level VIN drops, the more transistor M1 is turned on. This provides that the voltage drop across R1 is reduced and that the reference voltage level VCL drops.

In an embodiment, current source I1 may supply a current of 4 μAmp. In this embodiment, the input voltage level may vary between 5.5 V and 1.8 V. Resistor R4 may have a resistance of 600 kΩ The second current source may have a magnitude of 2 μAmp. The voltage level between resistors R2 and R3 may be 0.4 V and the voltage level between resistors R1 and R2 may be 0.6 V. The reference voltage level VCL may then vary between 1.3 V and 0.6 V while the input supply voltage rail VIN varies between 2.5 V and 1.8 V. A VCL value of 1.3 V represents the maximum current limit, while 0.6 V represents no current. Thus, the current limit dynamically decreases from the set maximum value valid above 2.5 V VIN to 0A at 1.8V VIN which is still above the under-voltage lockout threshold.

Figure 2:
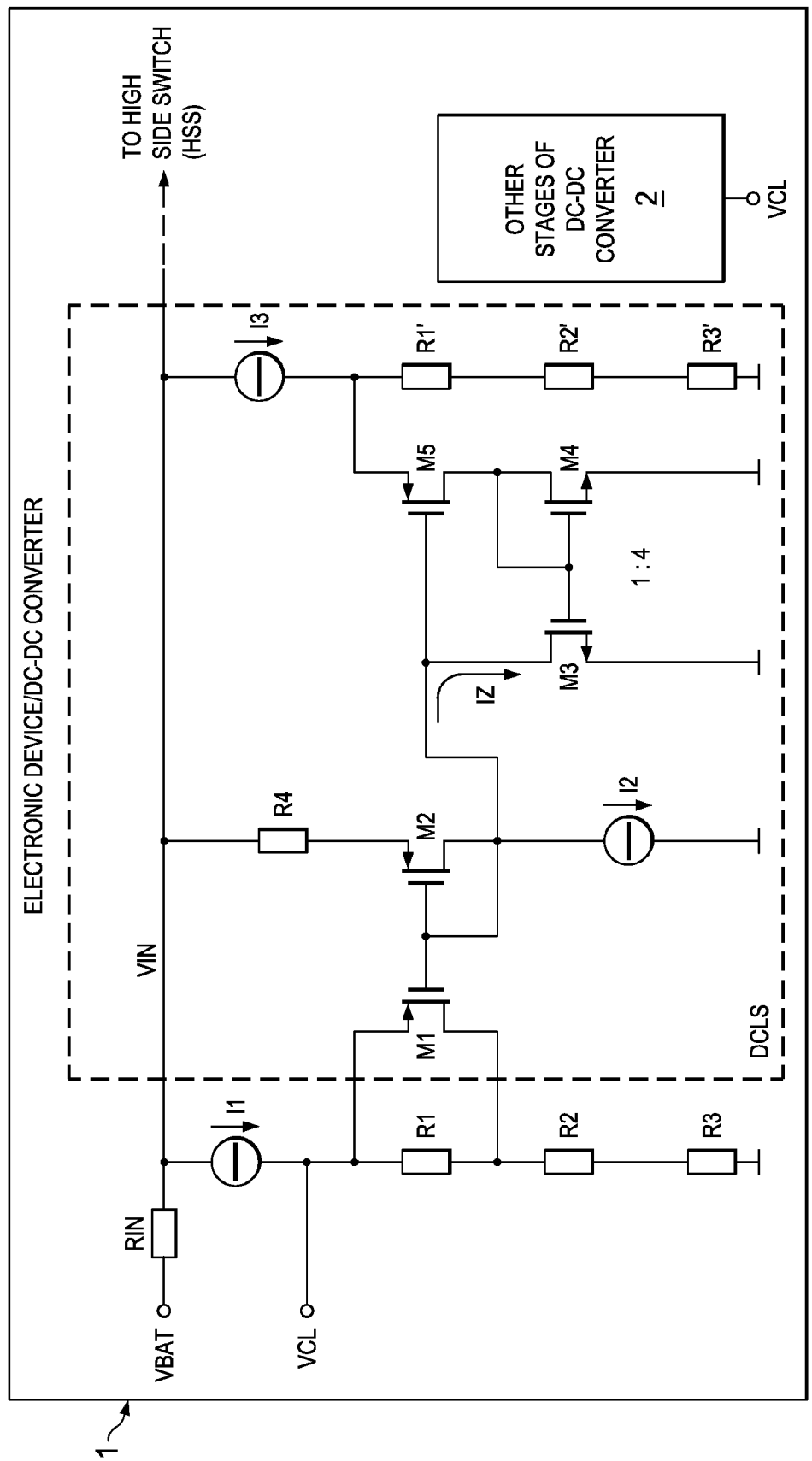
FIG. 2 shows a simplified circuit diagram of a second embodiment of the invention.

FIG. 2 shows a simplified circuit diagram of another embodiment of the invention. The electronic device 1 may also be configured for DC-DC conversion. It may include a dynamic current limit stage DCLS partially similar to the one shown in FIG. 1. Furthermore, the current sensor stage may include additional circuitry for extending the dynamic current limit. The circuitry includes transistors M3, M4 and M5, a current source I3 and resistors R1', R2' and R3'. Resistors R1', R2' and R3' may have the same resistance values as resistors R1, R2 and R3. These resistors R1, R1', R2, R2' and R3, R3' may be matched in order to achieve that the trigger voltage remains basically unchanged with and without the additional stage. However, the slope or the characteristic of the current limit reduction (or reference voltage reduction) may be changed without affecting the trigger voltage. However, in a simplified embodiment a single resistor may be used instead of R1', R2' and R3'. Current source I3 may be similar to current source I1. Transistors M3 and M4 may be coupled in a current mirror configuration. They may have a minor factor of 1:4. The drain of transistor M3 may then be coupled to a control gate of transistor M5. The sources of transistors M3 and M4 may be coupled to ground. The drain and the control gate of transistor M4 may be coupled to the drain of transistor M5. M5 may be a PMOS transistor and transistors M3 and M4 may be NMOS transistors. The drain of transistor M3 and the control gate of transistor M5 may then be coupled to the control gates of transistors M1 and M2 and the drain of transistor M2. This provides that an additional current IZ can flow from the drain of transistor M2 through transistor M3 to ground. The input voltage level may vary between 5.5 V and 1.85 V. Resistor R4 may have a resistance value of 500 kΩ The voltage drop across resistor R4 may be between 1 V and 1.25 V. The voltage level at the source of transistor M2 may then vary between 4.5 V and 0.6 V. The voltage level at the source of transistor M5 may vary between 1.2 V and 0.6 V. Due to the mirror factor of 1:4, the additional current IZ drawn from the drain of M2 may vary between 0 and 0.5 μAmp. The minor factor of 1:4 can be changed in order to change the characteristic of the dynamic current (or reference voltage) control.

Figure 3:
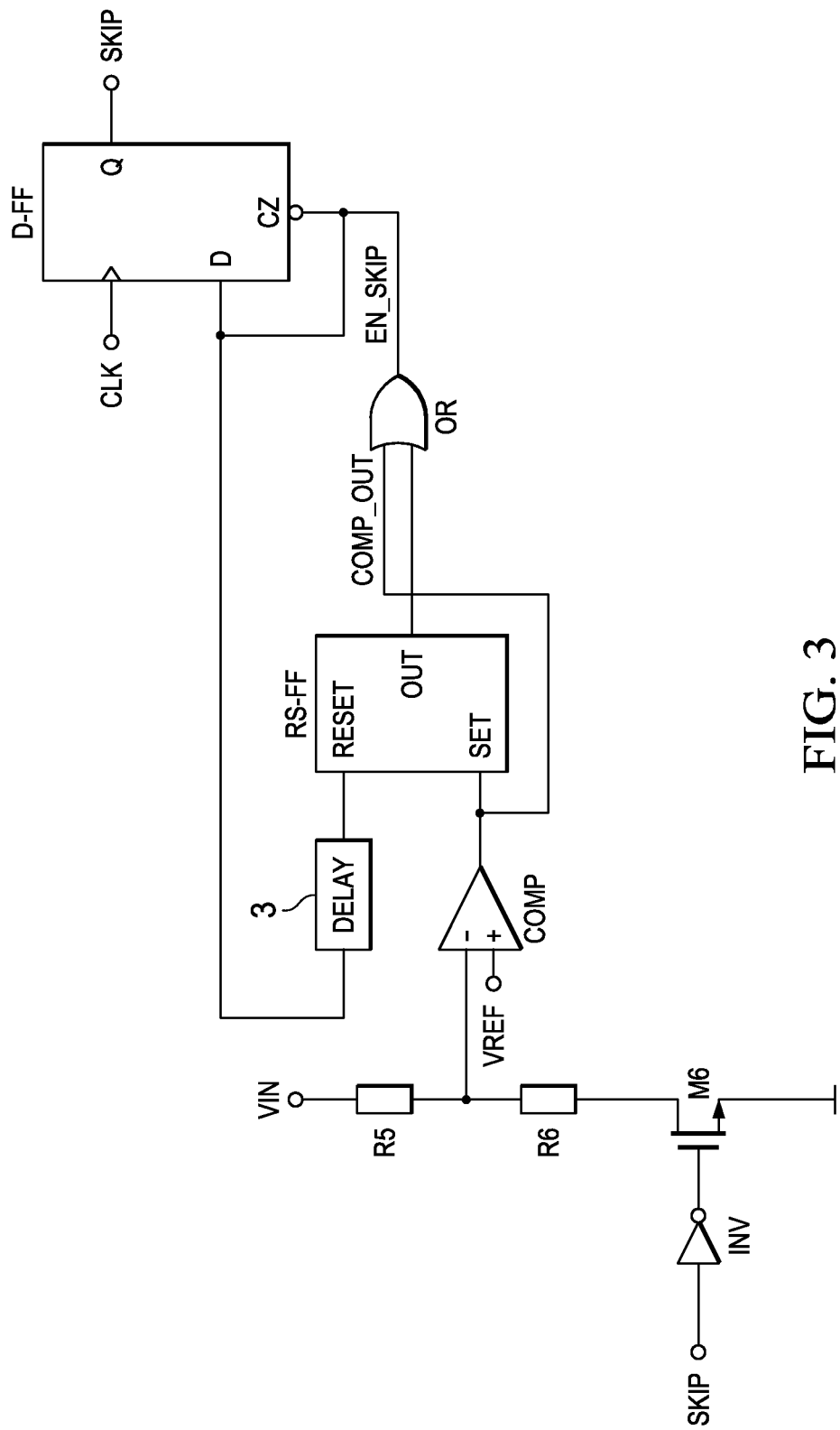
FIG. 3 shows a simplified circuit diagram of a circuitry relating to an aspect of the invention.

FIG. 3 shows a simplified circuit diagram of an embodiment according to an aspect of the invention. The circuit provides a mechanism to switch into power save mode if the input voltage level drops below 1.8 V. Input voltage rail VIN is coupled to a resistor R5 which is coupled in series with the resistor R6 and the channel of a transistor (NMOS) M6. The source of M6 is coupled to ground. The control gate is coupled to an inverter INV, the input of which is coupled to receive a signal SKIP. The voltage level between resistors R5 and R6 (which is a fraction of the input voltage level VIN) is coupled to a negative input of a comparator COMP. The positive input of the comparator COMP receives the reference voltage level VREF. The output of comparator COMP is coupled to the set input of an RS flip-flop RS-FF. The output of the RS flip-flop RS-FF is coupled to an OR gate. The other input of the OR gate receives a signal COMPOUT. The output of the OR gate is coupled to a control input of a D-flip-flop D-FF. The output signal of the OR gate is a signal ENSKIP referring to "enabling power save mode". Power save mode is the generic term covering different kind of power saving mechanisms, as for example a skip mode. If the under voltage lockout threshold is lower than 1.8 V, the electronic device including the circuitry shown in FIG. 3 may not shut down even with very high output impedances of the input power supply. The delay stage 3 may have a delay of 5 μs. This means that the circuit periodically checks whether or not the input voltage level VIN is high enough to leave the power save mode.

Figure 4:
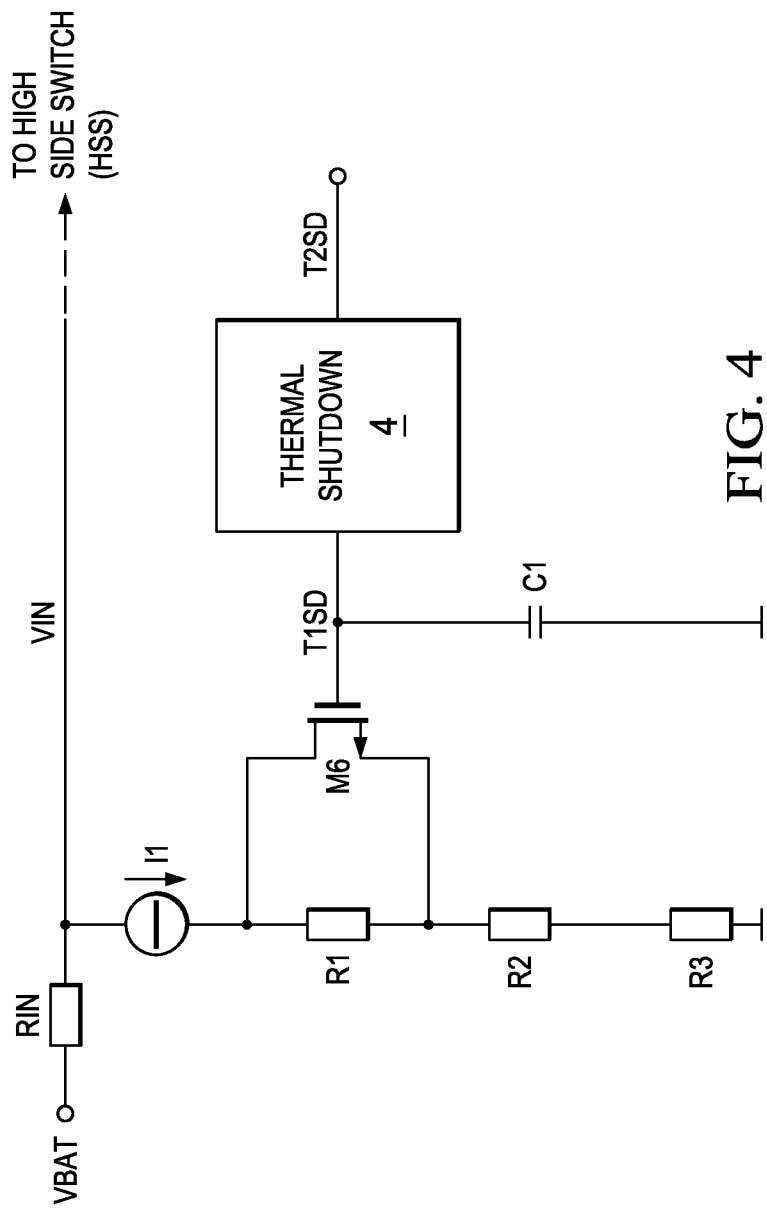
FIG. 4 shows a simplified circuit diagram of a circuitry relating to another aspect of the invention.

FIG. 4 shows a simplified circuit diagram of an embodiment of another aspect of the invention. Similar to FIGS. 2 and 3, there is a resistive divider R1, R2, and R3 coupled to a current source I1. There is a transistor M6 coupled in parallel to resistor R1. The control gate of transistor M6 is now controlled by a thermal shutdown stage 4. This stage provides that the current limit is reduced above a specific temperature (for example 130° C.) in order to reduce power consumption and to avoid thermal shutdown at an upper limit above the first temperature (for example 140° C.). This aspect of the invention provides that rather short overload conditions may not cause complete shutdown. The thermal shutdown stage 4 issues two different shutdown signals T1SD and T2SD. The first shutdown signal T1SD already controls M6 and thereby the reference voltage level before the second shutdown signal T2SD triggers the complete shutdown of the device. M6 may be coupled in parallel to transistor M1 shown in FIGS. 1 and 2 in order to implement the described thermal behavior in addition to the dynamic current limit according to the embodiments shown in FIGS. 1 and 2.

Although the present invention has been described in detail, it should be understood that various changes, substitutions and alterations can be made thereto without departing from the spirit and scope of the invention as defined by the appended claims.

The invention claimed is:

1. An electronic device for DC-DC conversion of an input voltage into an output voltage comprising a current mode control loop for controlling a sensed current of the DC-DC conversion by comparing a voltage level indicating a magnitude of the output current with a reference voltage level indicating the maximum admissible magnitude of the sensed current, wherein the reference voltage level is dynamically adjusted in response to a change of an input voltage level, wherein the circuitry for dynamically adjusting the reference voltage level comprises a voltage divider for providing the reference voltage level and a transistor coupled to the voltage divider and wherein the transistor is controlled so as to vary a voltage drop of the voltage divider in response to the change of the input voltage level and wherein a control gate of the transistor is coupled with a control gate of a diode-coupled transistor which is coupled in series with a current source and a resistor which is coupled to receive the input voltage level.

2. The electronic device according to claim 1, wherein the voltage divider is a resistive voltage divider comprising a series of resistors, one side of a resistor of the series of resistors being coupled to a first side of the channel of the control transistor, another side of the resistor of the series of resistors being coupled to another side of the channel of the control transistor, whereby increasing or decreasing the voltage level on the control gate of the control transistor provides that the combined resistance of the control transistor and the resistor of the series of resistors is increased or decreased.

3. The electronic device according to claim 2, wherein a current source is coupled current source is coupled to the voltage divider in order to supply a constant current to the voltage divider, whereby the reference voltage level is only controlled through changing resistance of the control transistor, in response to variations of the input voltage level.

4. The electronic device according to claim 1, further comprising:
a second transistor coupled to the diode-coupled transistor;
a current mirror including a third transistor coupled to the second transistor; and
a second voltage divider coupled to the third transistor of the current mirror.

5. The electronic device according to claim 1, further comprising a power save mode detector to determine if the input voltage is high enough to leave a power save mode.

6. The electronic device according to claim 5, wherein the power save mode detector periodically checks the value of the input voltage.

7. The electronic device according to claim 1, further comprising a thermal shutdown stage to reduce a current limit value when a temperature of the device is above a predetermined temperature to thereby reduce power consumption of the device and avoid thermal shutdown of the electronic device.

8. A method of an electronic device for DC-DC conversion, the method comprising:
performing current mode control by generating a voltage level indicating a magnitude of a sensed current of the DC-DC conversion;
comparing the voltage level with a reference voltage level;
limiting the magnitude of the sensed current to a maximum based on the comparison result; and
adjusting the reference voltage level in response to an input voltage level of the input power supply by providing a reference voltage level from a voltage divider and a transistor coupled to the voltage divider and wherein the transistor is controlled so as to vary a voltage drop of the voltage divider in response to the change of the input voltage level and coupling a control gate of the transistor with a control gate of a diode-coupled transistor which is coupled in series with a current source and a resistor which is coupled to receive the input voltage level.

* * * * *